United States Patent [19]
Foster et al.

[11] Patent Number: 5,881,134
[45] Date of Patent: Mar. 9, 1999

[54] INTELLIGENT CALL PROCESSING PLATFORM FOR HOME TELEPHONE SYSTEM

[75] Inventors: Peter J. Foster, Dallas; Bernard F. Bareis, Carrollton, both of Tex.

[73] Assignee: Voice Control Systems, Inc., Dallas, Tex.

[21] Appl. No.: 707,109

[22] Filed: Sep. 3, 1996

Related U.S. Application Data

[63] Continuation of Ser. No. 348,788, Dec. 2, 1994, abandoned.

[51] Int. Cl.$^6$ .................................................. H04M 1/64
[52] U.S. Cl. ........................ 379/88; 379/102.02; 379/216; 379/142
[58] Field of Search ............................... 379/88, 67, 201, 379/216, 88.01, 88.02, 88.04, 142

[56] References Cited

U.S. PATENT DOCUMENTS

| | | | |
|---|---|---|---|
| 3,928,724 | 12/1975 | Byram et al. | 379/80 X |
| 4,275,266 | 6/1981 | Lasar | 704/275 |
| 4,340,800 | 7/1982 | Ueda et al. | 219/714 |
| 4,462,080 | 7/1984 | Johnstone et al. | 704/200 |
| 4,520,576 | 6/1985 | Molen | 34/534 |
| 4,578,540 | 3/1986 | Borg et al. | 379/40 |
| 4,644,107 | 2/1987 | Clowes et al. | 379/354 |
| 4,698,839 | 10/1987 | DeVaney et al. | 379/60 |
| 4,704,696 | 11/1987 | Reimer et al. | 704/275 |
| 4,870,686 | 9/1989 | Gerson et al. | 379/355 X |
| 4,885,766 | 12/1989 | Yasuoka et al. | 379/102.03 |
| 4,945,557 | 7/1990 | Kaneuchi et al. | 379/67 |
| 4,961,212 | 10/1990 | Marui et al. | 379/67 |
| 5,042,063 | 8/1991 | Sakanishi et al. | 379/88 |
| 5,127,045 | 6/1992 | Cragun et al. | 379/88 |
| 5,148,471 | 9/1992 | Metroka et al. | 379/88 X |
| 5,182,765 | 1/1993 | Ishii et al. | 379/88 |
| 5,200,987 | 4/1993 | Gray | 379/40 |
| 5,220,595 | 6/1993 | Uehara | 379/74 |
| 5,222,125 | 6/1993 | Creswell et al. | 379/201 |
| 5,267,307 | 11/1993 | Izumi et al. | 379/354 |
| 5,276,731 | 1/1994 | Arbel et al. | 379/88 |
| 5,297,183 | 3/1994 | Bareis et al. | 379/88 X |
| 5,327,486 | 7/1994 | Wolff et al. | 379/142 X |
| 5,329,578 | 7/1994 | Brennan et al. | 379/211 |
| 5,349,638 | 9/1994 | Pitroda et al. | 379/142 |
| 5,353,336 | 10/1994 | Hou et al. | 379/67 |
| 5,384,831 | 1/1995 | Creswell et al. | 379/211 |
| 5,392,340 | 2/1995 | Otsuka | 379/216 |
| 5,394,445 | 2/1995 | Ball et al. | 379/67 |
| 5,412,711 | 5/1995 | Hayashi | 379/67 |
| 5,424,587 | 6/1995 | Federowicz | 379/79 X |
| 5,434,906 | 7/1995 | Robinson et al. | 379/67 |
| 5,452,340 | 9/1995 | Engelbeck et al. | 379/67 |
| 5,483,579 | 1/1996 | Stogel | 379/88 |
| 5,566,236 | 10/1996 | McLampy et al. | 379/201 |
| 5,594,784 | 1/1997 | Velius | 379/88 |

*Primary Examiner*—Fan S. Tsang
*Attorney, Agent, or Firm*—David H. Judson

[57] ABSTRACT

The present invention comprises an intelligent call processing platform for use with a home telephone system. The system consists of a processing unit interfaced with a variety of memory storage areas, a switching central office providing local telephone service and a plurality of telephone handsets. Using a variety of voice and/or pushbutton commands, a user is able to access a variety of telephone services from any telephone interfaced with the platform. Services provided include identification of incoming callers, automatic speed dialing of user-stored telephone numbers, storage of new numbers to the user-stored list of telephone numbers, and control of peripheral systems interconnected with the intelligent call processing platform.

26 Claims, 14 Drawing Sheets

INTELLIGENT CALL PROCESSING PLATFORM FOR HOME TELEPHONE SYSTEM

This is a continuation of application Ser. No. 08/348,788 filed on Dec. 2, 1994, now abandoned.

TECHNICAL FIELD

The present invention relates generally to a centralized control system for a group of telephones located, for example, in a home, and more particularly to the use of voice commands in conjunction with voice recognition and speaker verification techniques to provide a variety of telephone services for the users of such telephones.

BACKGROUND OF THE INVENTION

Conventional telephone systems for the home or office include one or more telephone sets normally connected to a telephone switching center (i.e., a central office, PBX, or key telephone system) through a cable. With the advent of economical and reliable digital technology, recently it has been possible to provide enhanced functionality to the typical telephone. Thus, many companies are now manufacturing and marketing such devices as videophones, display phones, digital answering machines, screen-based, menu-driven phones and the like. These devices facilitate provision of various caller services including call forwarding, call waiting, voice store and forward, billing assistance, caller identification, and other functions. Although such devices provide significant operational capabilities as compared to conventional telephone sets, there are a myriad of service offerings and the various types of equipment have yet to be successfully integrated into a single system that can be conveniently or selectively controlled by the telephone users.

Thus, there remains a need to provide an intelligent call processing apparatus for interfacing to, to be controlled through, and to control a plurality of telephones located in a defined area, such as a home, to facilitate enhanced telephone service offerings.

BRIEF SUMMARY OF THE INVENTION

It is an object of the present invention to provide a centralized control system for one or a plurality of telephones in a home or other similar environment wherein preferably voice commands are used to control access to and operation of one or more telephone service offerings.

It is a further feature of the present invention to implement a voice recognition and-or speaker verification control system in conjunction with an intelligent call processing platform interconnected to a plurality of telephone sets to thereby provide feature control of one or more telephone service offerings.

It is still another feature of the invention to provide an intelligent call processor connectable to telephone sets in a home or office facility to provide monitoring of incoming telephone calls to facilitate preferably voice control over one or more enhanced caller services, for example, caller identification, call-blocking, call store and forward, or smart ringing.

It is another object to provide a call processing platform that facilitates a central implementation of a number of ancillary services for all telephones in the home, even if such telephones are conventional handset devices.

It is a still further object of the invention to describe an intelligent processing apparatus that interfaces to telephone sets to monitor an incoming telephone line, whether that line is a conventional wire line, coaxial cable, or wireless connection. The apparatus is preferably voice-activated and controlled to provide one or more call services at the request of selective persons in the home but may also be operated via DTMF digits.

It is yet another object of the present invention to provide an apparatus having on-line monitoring capabilities for the selective offering and providing of various ancillary services under the voice control of one of the parties to the call.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
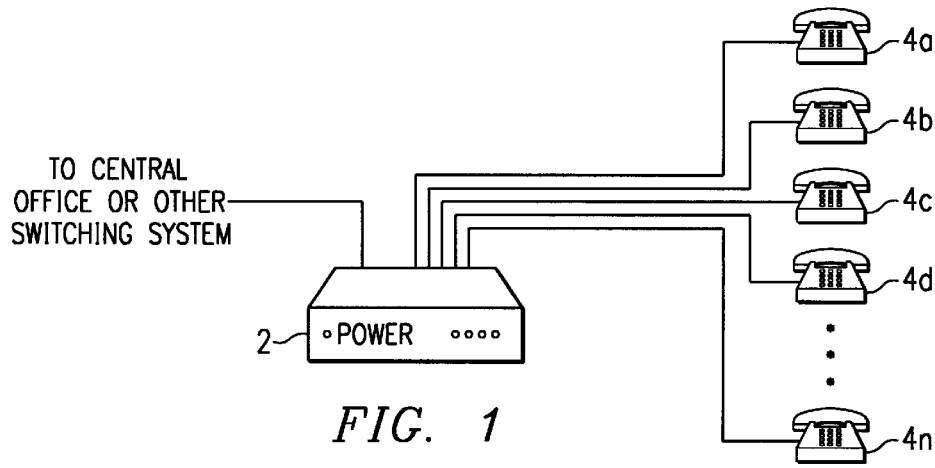
FIG. 1 is a block diagram of a telephone system incorporating the basic version of the intelligent call processing platform of the present invention.
Figure 2:
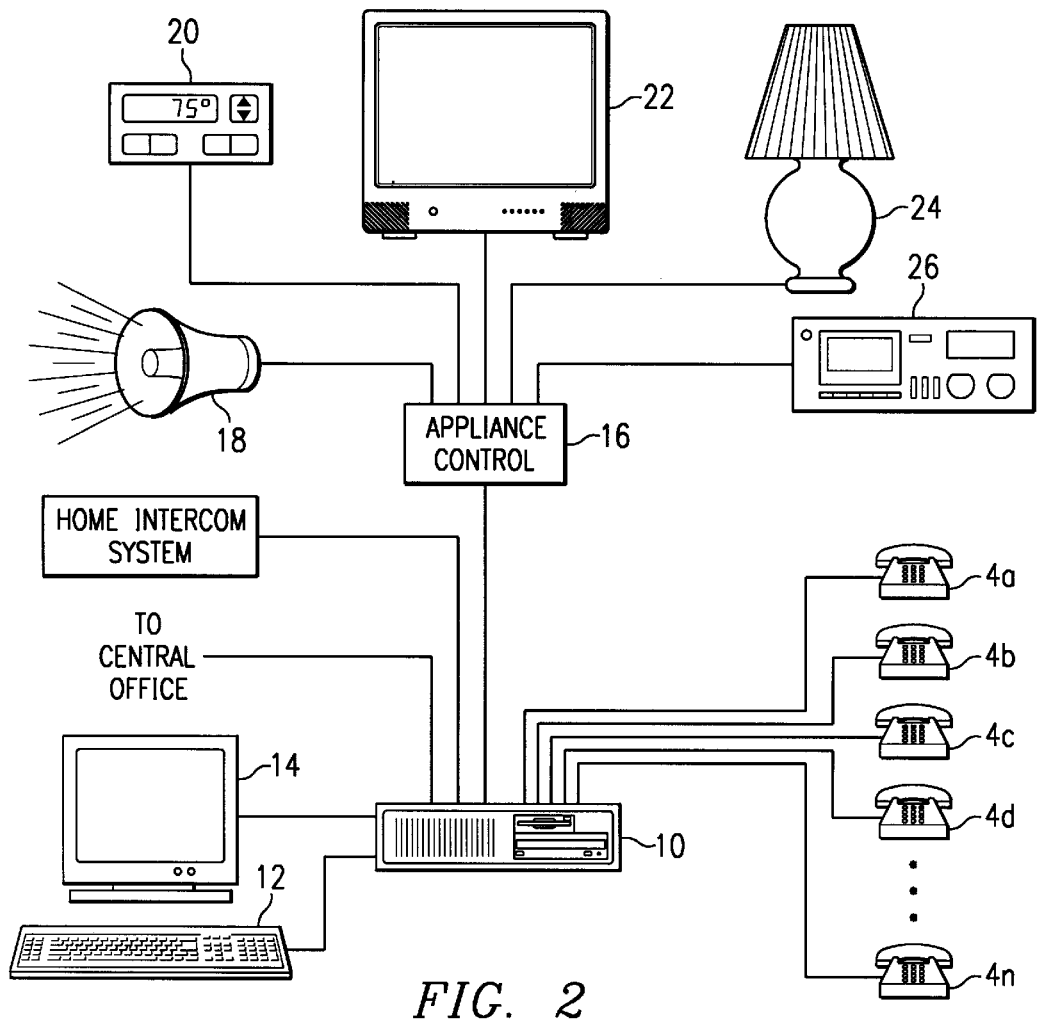
FIG. 2 is a block diagram of a telephone system incorporating the enhanced version of the intelligent call processing platform of FIG. 1.

As seen in FIG. 1, the intelligent call processing platform 2 of the present invention is preferably implemented in a home which typically includes one or a plurality of telephone sets 4a . . . 4n. FIG. 2 shows an enhanced version of FIG. 1 and allows for additional features. The core system components shown in FIG. 3 for both FIG. 1 and FIG. 2 are the same with the exception that the system depicted in FIG. 2 is installed in a personal computer or any processor controlled system and utilizes the optional PC interface 36. Although the present invention is shown in the environment of a home, it should be appreciated that the intelligent call processor is likewise useful whenever it is desired to provide a number of telephone sets with certain enhanced features as will be seen. Thus, the example of an intelligent home system is merely exemplary.

The intelligent call platform is preferably connected between a switching system or switching central office and the telephone sets 4. As seen in FIG. 1 or FIG. 2, the platform is connected to all of the telephone sets, although this is not a requirement of the system. The method of connection between the platform and telephone sets may be serial or parallel. The switching office is typically a local telephone operating company central office operating within a so-called local access and transport area (LATA) although this is not the only configuration in the invention. When long distance service is required, the call is usually transmitted through the operating company central office to a point of termination in the originating LATA at which it is picked up by a common carrier and passed by that carrier on to a termination point in a local or distant LATA. Such operation is conventional in the art. Moreover, while the physical connections shown in FIG. 1 and FIG. 2 are typical it is envisioned that the home be connected to the switching office alternatively via a coaxial cable, fiber optic cable, wireless link or other suitable connection. Such alternative communication channels are also known.

Figure 3:
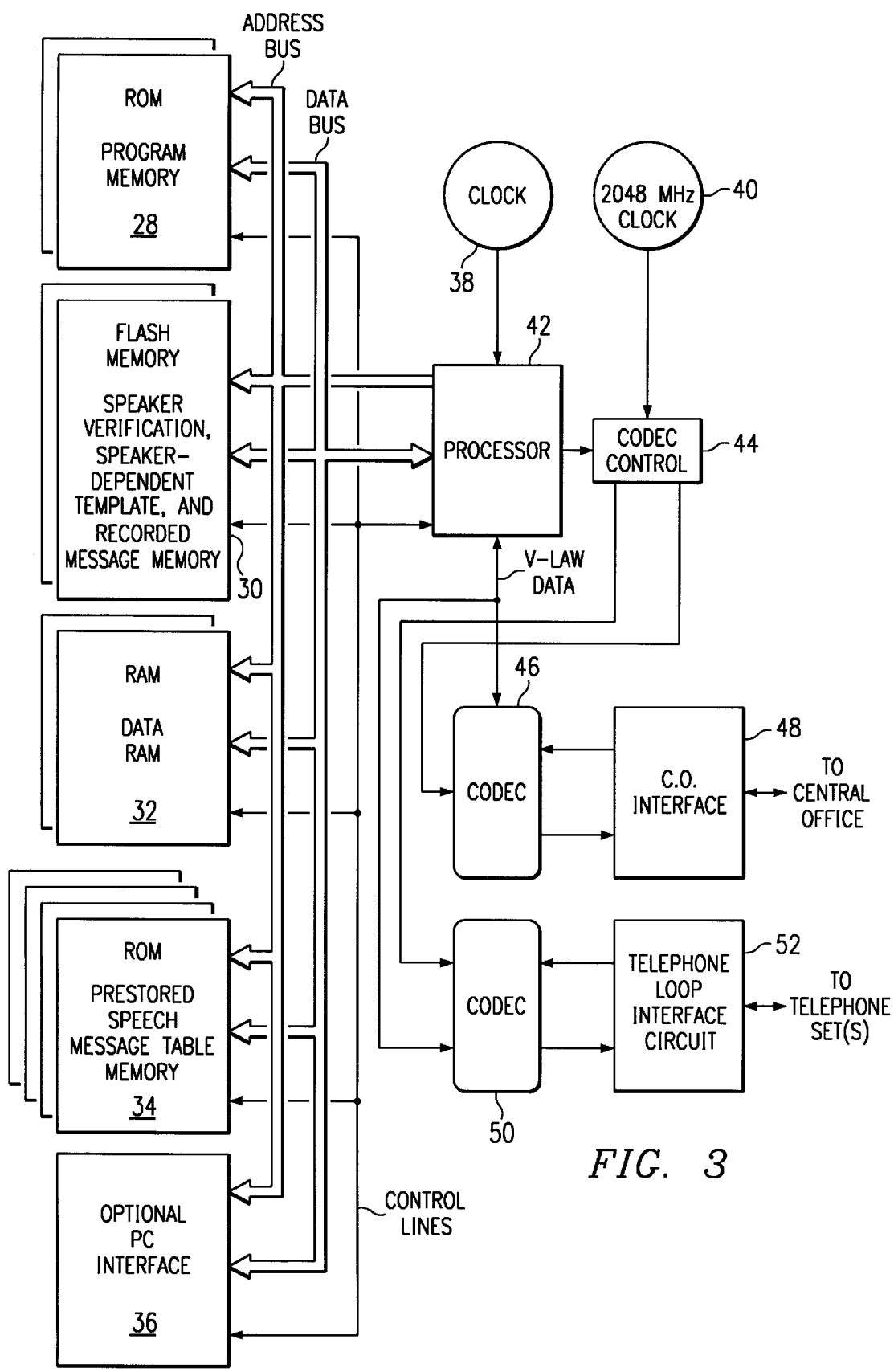
FIG. 3 is a detailed system diagram showing the components of the intelligent call processing platform of FIG. 1 and FIG. 2.

The intelligent processing platform shown in the system diagram of FIG. 3 includes a voice recognition algorithm as well as a speaker verification algorithm to facilitate voice-controlled access and control over various service offerings. The platform may alternatively include DTMF digit recognition algorithms to provide access and control over the service offerings. The platform includes a digital signal processor (DSP) 42 for controlling the overall operation of the system. The DSP includes data, address, and control buses represented in FIG. 3. As seen in FIG. 2, the enhanced platform 10 may also include conventional input/output devices such as a keyboard 12 and display terminal 14 and may additionally include a mouse, microphone, speech generator, and printer. A communications interface 52 interfaces the platform to the internal telephone sets and a communications (C.O.) circuit 48 interfaces the platform to external telephone lines. If alternative communication links (such as coaxial cable) are used, the interface 48 will include additional circuitry to interface the additional signaling (such as video or the like) to the intelligent processing platform.

The platform also includes a voice and/or video store and forward capability for recording messages. Random access memory ("RAM") 32 is connected to the DSP by the address, data, and control buses for providing temporary storage of data processed thereby. Read only memory ("ROM") 28 is likewise connected to the digital processor for providing nonvolatile operational code. ROM 34 is likewise connected to the digital processor for providing permanent storage of speaker-independent recognition tables and prestored messages for instructing the user on his/her progress when operating the system. Verification data is stored in programmable nonvolatile FLASH Memory 30. For the enhanced version, disk storage on the personal computer 10 may support control programs including the voice recognition algorithm and the voice verification algorithm as well as suitable control programs (not shown). A voice command system of this type is described in copending application Ser. No. 07/523,486, filed May 15, 1990, to Hunt et al., titled "Simultaneous Speaker-Independent Voice Recognition And Verification Over A Telephone Network," assigned to the assignee of the present invention and incorporated herein by reference.

The voice recognition algorithm may be based on speaker-dependent or speaker-independent discrete, speaker-independent phonetic, connected or continuous recognition. Such techniques are known in the art. Where reduced cost is required, speaker-dependent algorithms are preferably used. A predetermined set of commands may be used in the system and/or commands may be created in a known manner. In particular, where the user desires to create special commands, the system prompts the user to speak the command a number of times while the recognizer is "trained" in a conventional manner. A template (e.g., speech reference data) is created for each command and store in memory, and the user typically will then enter the telephone number associated with such command for later retrieval whenever the command is recognized. Thus a user may create a number of special call commands, e.g., "account balance," "directory assistance," "grandma," etc., the recognition of which control the processing platform to dial a stored number and/or dialing sequence associated therewith.

The platform shown in FIG. 3 also includes a speaker verification reference database stored in FLASH Memory 30 comprising speaker verification class reference data collected from users authorized to access the service offerings. In this way, the platform allows control over the service offerings by selected members of the home. Thus, for example, one or more family members may enroll his or her "voice" in the speaker verification reference database and thus, as will be seen, exercise control over the ability of other members (such as children) to access certain services. Thus, certain of the service offerings may be programmed to be accessible only if voice commands are both recognized and/or verified to have come from a person authorized to obtain the service. The use of speaker verification thus provides an additional level of security which has numerous advantages. For example, parents may program the platform to prevent children from making unauthorized calls since such calls will only be allowed if the voice command used to institute the call is both recognized and the speaker is authorized for the service. Additionally, the speaker verification capability will provide security for remotely accessing recorded messages and will allow user specific access to the recorded messages. Recorded messages will be stored in the Flash Memory of FIG. 3 for systems as shown in FIG. 1, but may optionally be stored on the disk drive of the personal computer 10 of FIG. 2, or any other system memory.

In a caller identification application, the database in the platform may be programmed to include one or more telephone numbers or groups of telephone numbers that the homeowner desires to block; alternatively, the database may be programmed to identify those telephone numbers from which the caller desires to receive calls. Additionally, specific outgoing calls may be blocked respectively for each user. When undesirable calls are received, the platform redirects the calls to the play message routine of FIG. 6 or the record routine of FIG. 7 to play an audio and/or video announcement message and/or to record a message for the homeowner. The calls are identified using the Caller ID number transmitted with each telephone call.

The platform is preferably accessible for each of the telephones in the home (or the platform itself via the microphone) to facilitate voice control of such functions as dialing, call forwarding, voice store and forward, smart ring, caller identification, call waiting, message playback, and the like. Incoming calls may be directed to specific telephones or messaging centers using smart ring or incoming caller identification. Alternatively, the telephone systems may be accessed by push button when DTMF recognition procedures are used.

Figure 4:
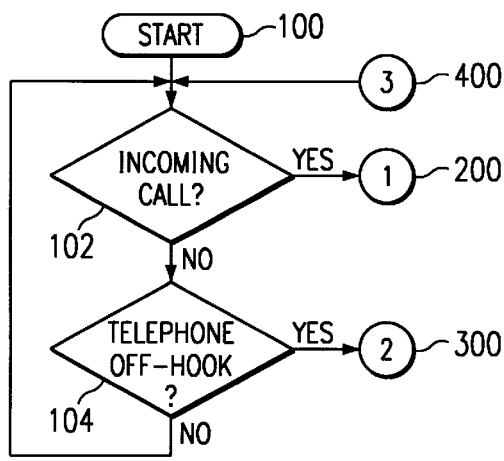
FIG. 4 is a flow chart of the executive routine from which all other routines are accessed.

Referring now to FIGS. 4 through 18, wherein there is illustrated a plurality of flow charts illustrating the operating routines enabling voice or DTMF control of a variety of telephone services through the Intelligent Call Processor Platform. FIG. 4 illustrates the executive routine through which all calls and all command routines are accessed. The system monitors at step 102 for an incoming call. When an incoming call is detected, the call is forwarded to the incoming call handler routine which will be more fully discussed with respect to FIG. 5. When no incoming calls are detected control passes to inquiry step 104 to determine if an off-hook condition exists. When no off-hook condition exists, control returns to step 102, and the executive routine continues to monitor for either an incoming call or telephone off-hook condition. If a telephone off-hook condition is detected, control passes to the originating call/command handler routine described with respect to FIG. 8.

Figure 5:
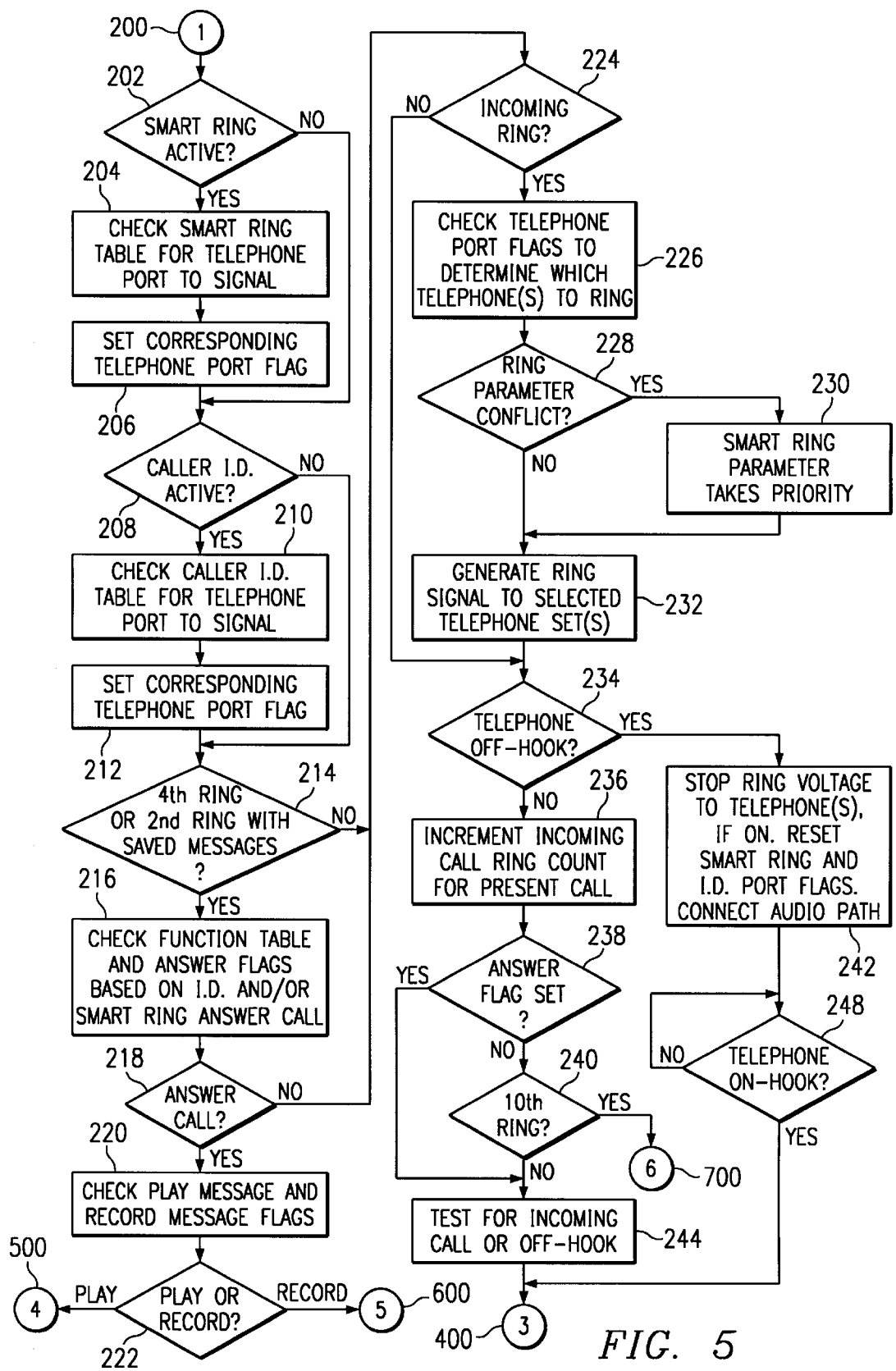
FIG. 5 is a flow chart of the incoming call handler routine for directing and/or controlling incoming telephone calls.

Referring now to FIG. 5, there is illustrated the incoming call handler routine. The incoming call handler routine directs and/or controls incoming telephone calls and assists in routing the call to the proper telephone service. A test performed at step 202 determines if the smart-ring service is active for the incoming call. If so, the smart-ring table stored in FLASH MEMORY 30 is accessed at step 204 to determine the proper telephone port to signal for the incoming call. The telephone port flag corresponding to the determined port is set at step 206. Once the telephone port flag is set or inquiry step 202 determines the smart-ring feature is not active, inquiry step 208 determines if the Caller I.D. function is active for the incoming call. When the Caller I.D. function is active, the Caller I.D. table is checked at step 210 to determine the telephone port to signal and the identity of the caller based upon the Caller I.D. transmitted with the call. The corresponding telephone port flag is set at step 212.

After setting the correct telephone port flag or determining the Caller I.D. function is not active, step 214 determines if a prerecorded message is to be played after the second or fourth ring. If such a message is to be played, the platform checks a function table and answer flag based upon the Caller I.D. and/or the smart-ring flags at step 216 to determine whether or not to answer the call. If the call should be answered, test step 218 passes control to step 220. When the call is answered, the play and record message flags are checked at step 220, and decision step 222 transfers control to either the play message routine of FIG. 6 or to the record incoming call routine of FIG. 7 based upon the settings of the control flag. A platform user may also set the flags after having an incoming call identified to the user based on the Caller I.D. The received Caller I.D. number may be looked up in the Caller I.D. table and the user notified of the name associated with the Caller I.D., or if the I.D. number is not in the table, the user may be notified with the calling number.

In accordance with another feature of the invention, an announcing means may announce to a user an identification associated with the source identifier of an incoming call after a trigger recognizer receives a command trigger input by the user through a telephone in the on-site telephone system.

Also, in accordance with another feature of the invention, all incoming calls are forwarded to a telephone service for recording messages in response to receipt of another command trigger by the trigger recognition means.

If the call is not answered or if a message is not to be recorded or played after the second or fourth ring, control passes to step 224 to scan for an incoming ring signal. When an incoming ring signal is detected, the processor checks the telephone port flags at step 226 to determine which telephones connected to the platform should be rung. Test step 228 determines if a ring parameter conflict exists, and if such a conflict exists, the smart-ring parameter takes priority at step 230. The ring signal is generated at step 232 to the selected telephone(s). When no ring parameter conflict exists, the ring signal is also generated at step 232 to the selected telephone(s).

Next, inquiry step 234 determines if the telephone is in an off-hook condition. When an off-hook condition does not exist, the incoming call ring count is incremented at step 236 for the present call. Inquiry step 238 determines if the call answer flag has been set, and if not, performs a test at step 240 to determine if the call ring count equals ten. If the call ring count equals ten, control passes to the system access routine of FIG. 16 to enable an outside caller to remotely access the system. If the call ring count does not equal ten or if the answer flag has not been set, a test is performed at step 244 to determine the existence of an incoming call or an off-hook condition. Control then passes back to the executive routine of FIG. 4.

Returning now to inquiry step 234, if the telephone is determined to be in an off-hook condition, the ring voltage to the telephone is discontinued, the smart-ring and I.D. port flags are reset and the audio path connected at step 242. The telephone is tested for an on-hook condition at step 248 until an on-hook condition is detected. Control then returns to the executive routine of FIG. 3.

Figure 6:
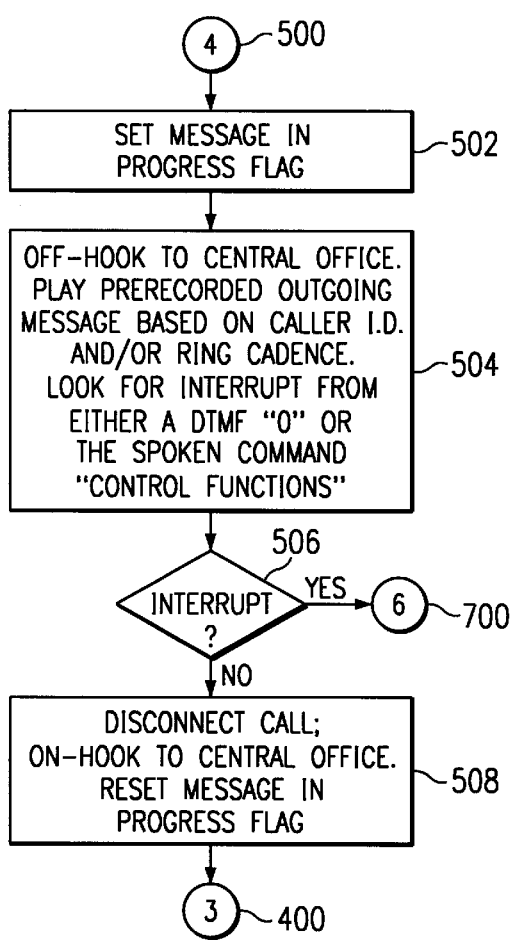
FIG. 6 is a flow chart of the routine for playing messages to incoming calls.

Referring now to FIG. 6, there is illustrated the routine for playing messages to incoming calls. Once inquiry step 222 of FIG. 5 determines a message is to be played, the message in progress flag is set at step 502. The phone is indicated at step 504 to have an off-hook condition at the central office and a prerecorded outgoing message is played based upon the Caller I.D. and/or ring cadence. A test is performed at step 506 to monitor for an interrupt condition of either a DTMF "0" digit or the spoken command "CONTROL FUNCTIONS." If an interrupt condition is detected, the outgoing message is interrupted and control passes to the system access routine of FIG. 16. Otherwise, after the prerecorded message has been played, the call is disconnected, an on-hook condition is indicated to the central office and the message in progress flag is reset at step 508. Control then returns to the executive routine of FIG. 4 to monitor for additional incoming calls or telephone off-hook conditions.

Figure 7:
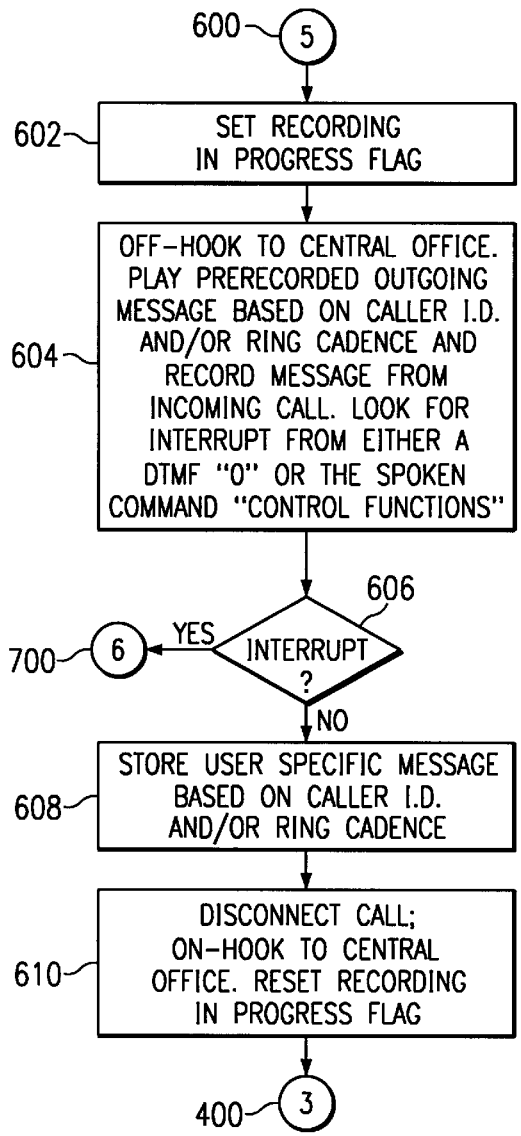
FIG. 7 is a flow chart of the routine for recording messages from incoming calls.

Referring now to FIG. 7, there is illustrated the record incoming call routine. This routine records an incoming call routed to its control functions. If inquiry step 222 of FIG. 5 indicates a call is to be recorded, the recording in progress flag is set at step 602. Next, the platform notifies the central office of an off-hook condition, plays a prerecorded outgoing message based upon the Caller I.D. and/or ring cadence and records a message from the incoming call at step 604. Inquiry step 606 monitors for an interrupt condition consisting either of a DTMF of "0" digit or the spoken command "CONTROL FUNCTIONS." If one of the interrupt conditions are detected, control passes to the system access routine of FIG. 16. Otherwise, the recorded message is stored at step 608 based upon the Caller I.D. and/or ring cadence. The system then resets the recording in process flag, disconnects the call and provides an on-hook indication to the central office at step 610.

Figure 8:
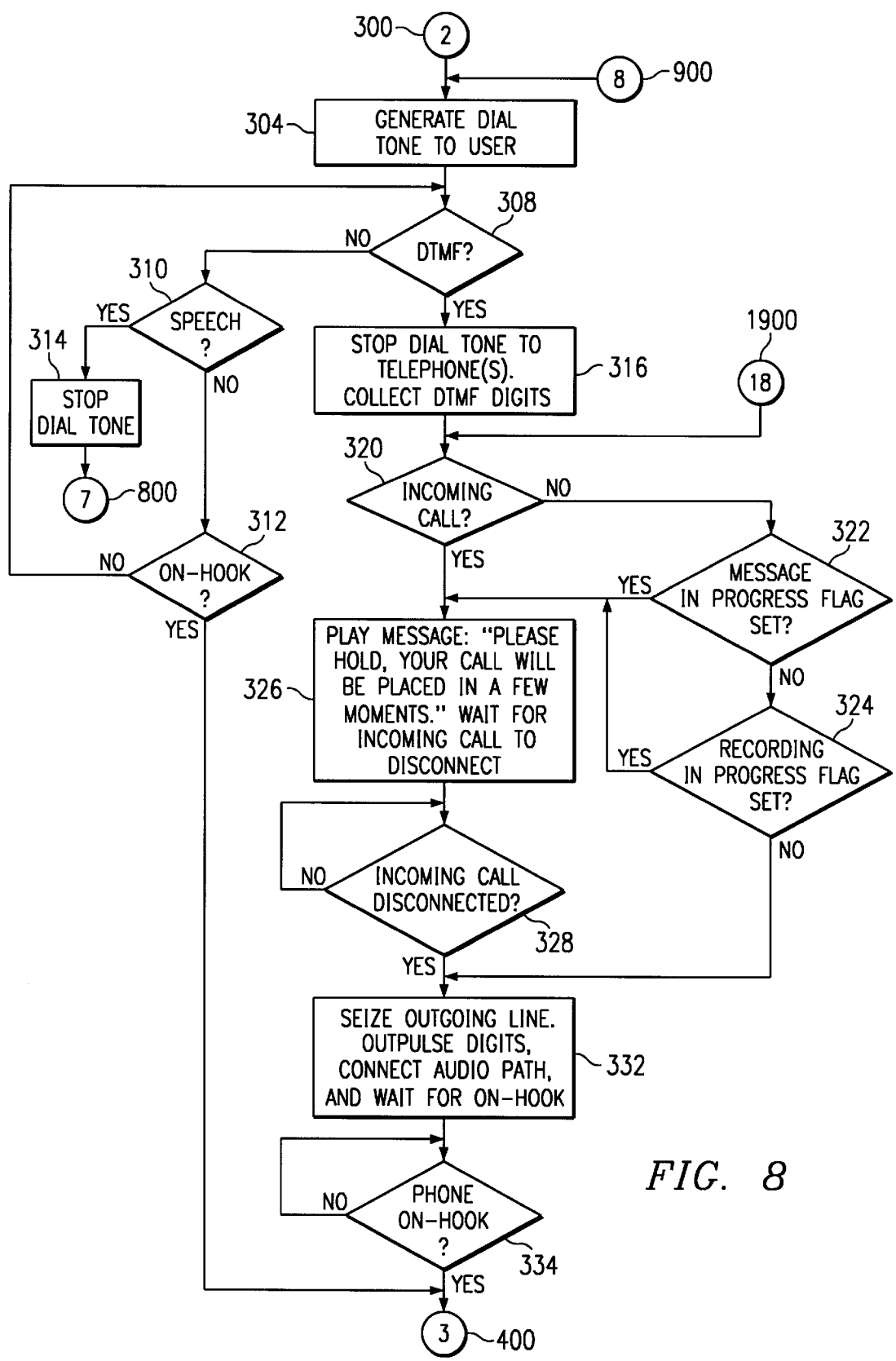
FIG. 8 is a flow chart showing the originating call/command handler routine which is accessed by the executive routine of FIG. 4 for defining operations that occur when the handset of a connected telephone has been lifted.

Referring now to FIG. 8, there is illustrated the originating call/command handler routine. This routine enables access of telephone functions from within the platform once the handset of a telephone connected to the platform has been placed in an off-hook condition. Once an off-hook condition is detected by inquiry step 104 of FIG. 4, a dial tone is generated at step 304 to the user. This may be the dial tone from the central office or an artificially generated dial tone. Inquiry step 308 tests for receipt of a DTMF digit. If a DTMF digit is detected, the dial tone is discontinued, and the provided DTMF digits are collected at step 316. Next, a check is performed at step 320 for any incoming calls. If no incoming calls are detected, tests are performed at step 322 and 324 to determine if the message in progress or recording in progress flags are set.

If neither of these flags are set, the outgoing line is seized, and the collected DTMF digits are outpulsed at step 332. If an incoming call is detected, or the message in progress or recording in progress flags are set, a message is played at step 326 asking the user to hold. Test Step 328 monitors for disconnection of the incoming call, and seizes the outgoing line at step 332 once the incoming call is disconnected. Once the outgoing line is seized, the DTMF digits are outpulsed and the audio path is connected. Step 334 monitors for an on-hook condition and passes control back to the executive routine of FIG. 4 when an on-hook condition is detected.

If no DTMF digits are detected at step 308, inquiry step 310 tests for a speech command on the telephone line. When a speech command is detected, the dial tone is discontinued at step 314 and control passes to the spoken command control routine of FIG. 9. When no speech commands are detected at step 310, inquiry step 312 monitors for an on-hook condition. If no on-hook condition exists, control returns to step 308 and the platform continues to monitor for DTMF digits or voice commands. When an on-hook condition is detected, the routine returns to the executive routine of FIG. 4.

Figure 9:
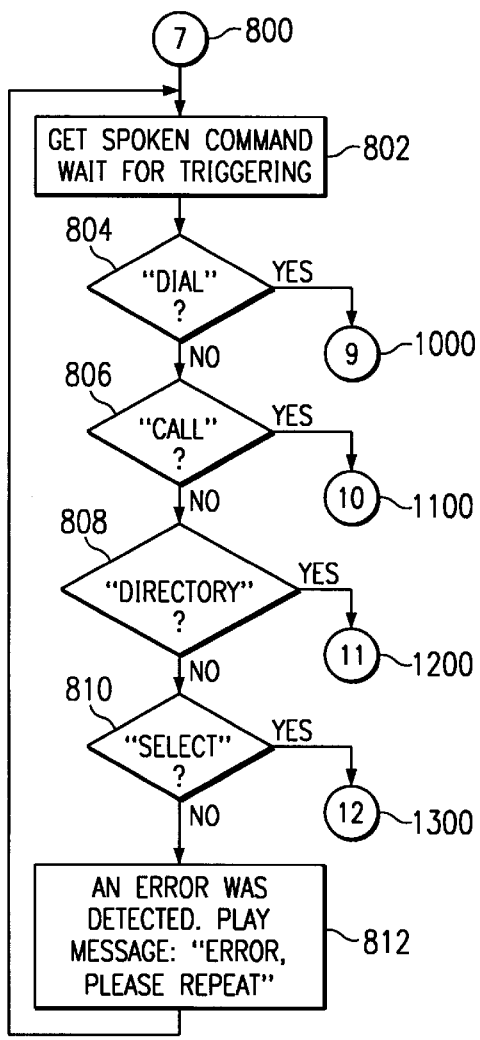
FIG. 9 is a flow chart of the routine for acquiring spoken commands.

Referring now to FIG. 9, there is illustrated the spoken command control routine. This routine enables a user to vocally select a variety of telephone services. The spoken command detected at step 310 of FIG. 8 is retrieved at step 802. A variety of tests are performed at steps 804, 806, 808 and 810 to determine which spoken command has been received. If a "DIAL" command is detected at step 804, control passes to the spoken digit collection routine of FIG. 10. If a "CALL" command is detected at step 806, control passes to the key word speed dialing routine of FIG. 11. The detection of a "DIRECTORY" command at step 808 passes control to the speed dialing from user director routine of FIG. 12. Finally, if a "SELECT" command is detected at step 810, the command is processed within the local branch of the system access routine of FIG. 16. If none of these voice commands are detected, an error condition exists and the "Error, please repeat" message is played to the caller or user at step 812. Control then returns to step 802 to monitor for the repeated spoken command.

Figure 10:
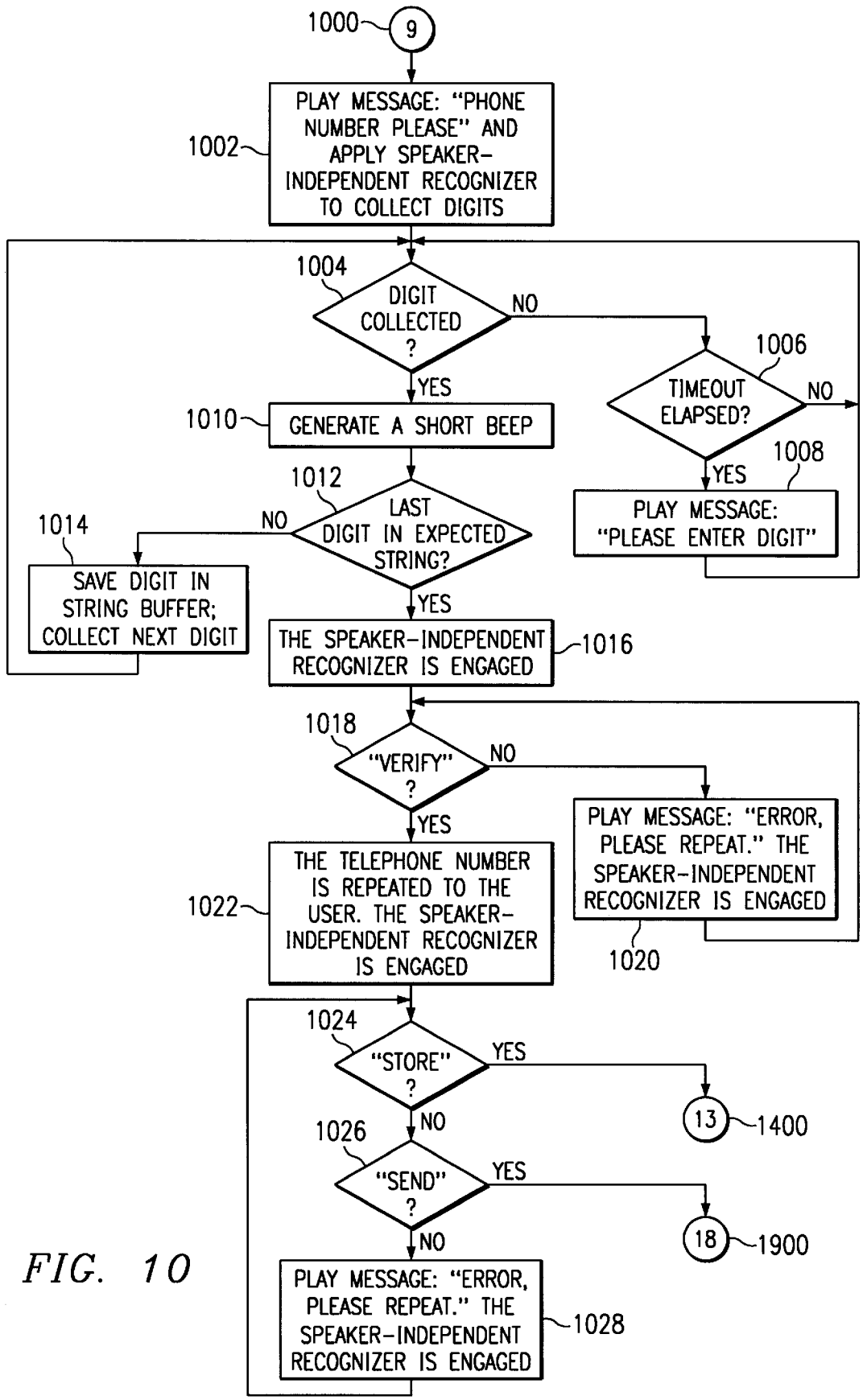
FIG. 10 is a flow chart of the spoken digit collection routine used to obtain spoken numeric sequences.

Referring now to FIG. 10, there is illustrated the spoken digit collection routine. This routine accepts a spoken digit string, representing a telephone number, from a user and forwards the number for dialing. A user is prompted at step 1002 with a "Phone number please" message to begin collection of the spoken number string. Inquiry step 1004 determines if a spoken digit has been collected. If a digit has not been collected, inquiry step 1006 determines if a time-out period for collection of the digit has elapsed. Once the required time-out period elapses a "Please enter digit" message plays at step 108 to prompt the user to enter or re-enter the required digit. Once step 104 determines a digit has been collected, a short beep is generated to the user at step 1010 to indicate the digit has been received and recognized. Inquiry step 1012 calculates if the previously collected spoken digit was the last digit expected in the string. If not, the digit is saved in a string buffer at step 1014 and control passes back to step 1004 to accept the next digit in the string.

Once the last digit of the numeric string has been collected, the speaker-independent recognizer is engaged at step 1016. Step 1018 monitors for the spoken command "VERIFY." If the "VERIFY" command is not received, a message instructing the user to repeat the "VERIFY" command is played at step 1020. Once a "VERIFY" command is recognized, the platform repeats the digit string to the user at step 1022.

Figure 13:
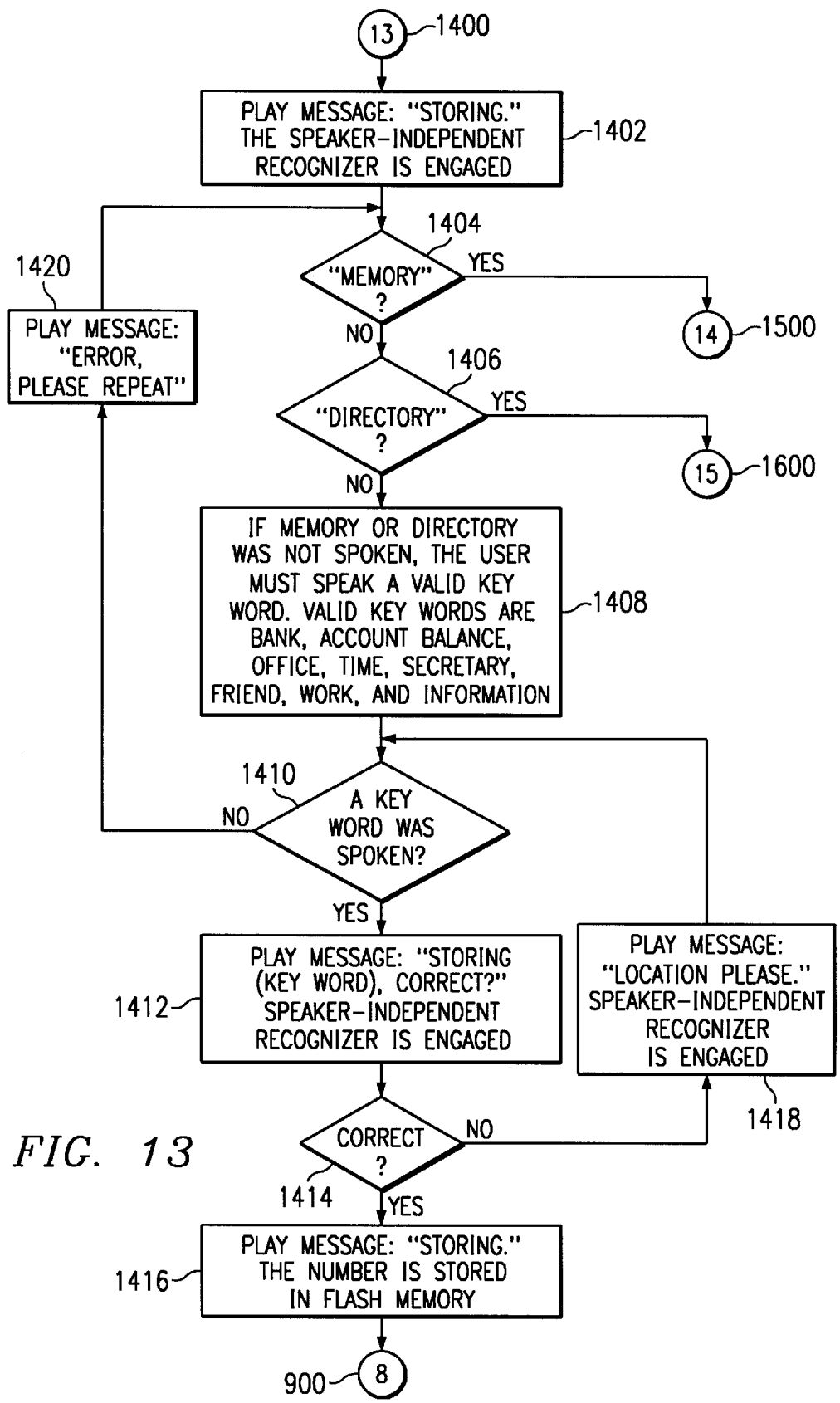
FIG. 13 is a flow chart showing the routine for programming speed dial numbers using key words.

Inquiry step 1024 monitors for the "STORE" voice command and passes control to the key word speed dial number storage routine of FIG. 13 when the command is detected. If no "STORE" voice command is detected, step 1026 monitors for a "SEND" voice command. Once a "SEND" voice command is detected, control passes to step 320 of the originating call/command handler routine of FIG. 8 to output the collected digit string. Otherwise, the message "Error, please repeat" prompts the user at step 1028 to provide the "STORE" or "SEND" command.

Figure 11:
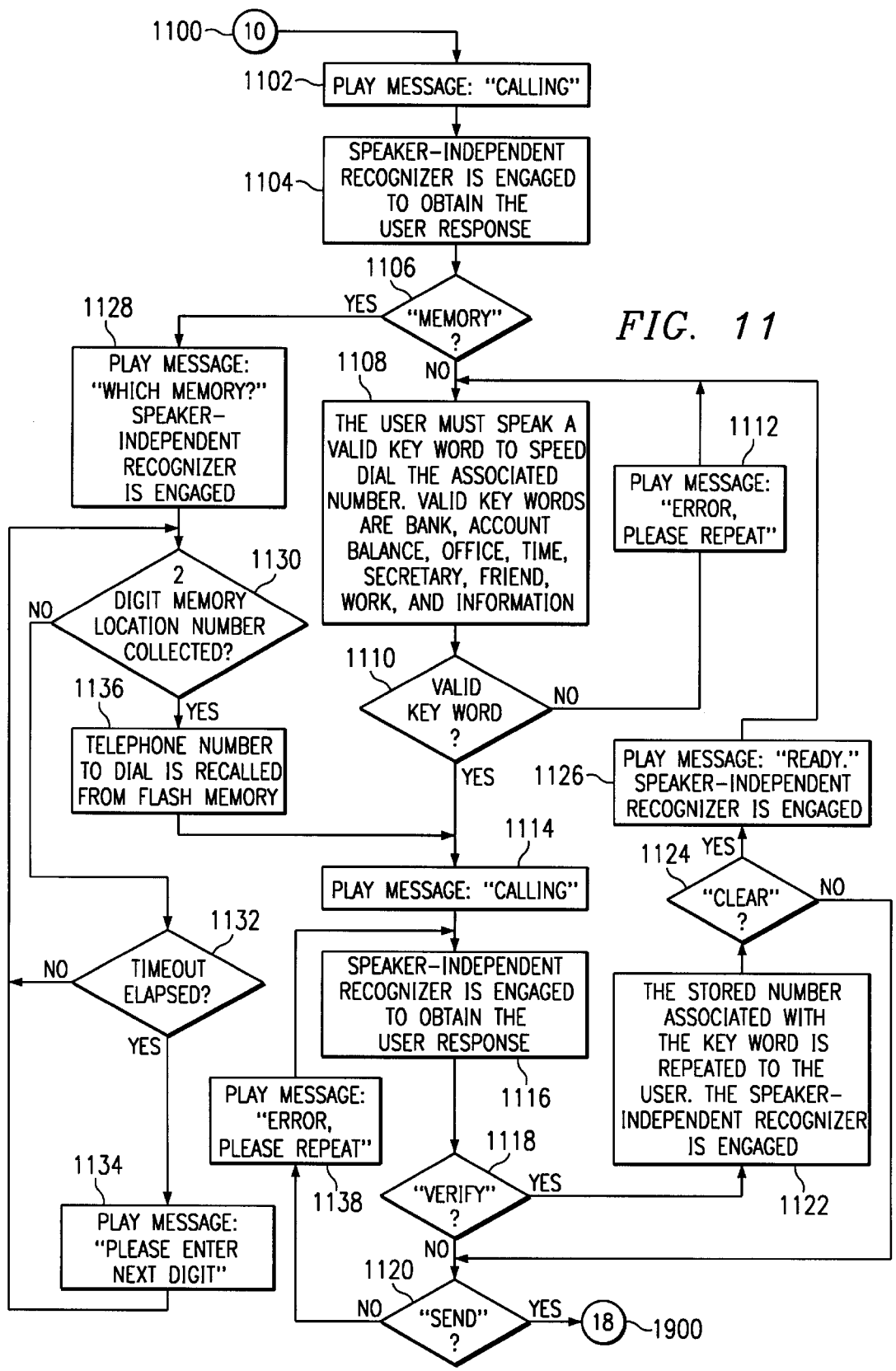
FIG. 11 is a flow chart showing the routine for providing speed dialing capabilities from spoken key words.

Referring now to FIG. 11, there is illustrated the key word speed dialing routine. This routine enables a user to access a previously stored telephone number in response to a spoken speaker-independent key word. At step 1102, the platform plays a message "Calling," prompting the user to begin the key word dialing sequence. The speaker-independent recognizer is engaged at step 1104 to obtain a user response. The speaker-independent recognizer monitors at step 1106 for the spoken command "MEMORY." If the "MEMORY" command is not detected, the user must speak a valid key word at step 1108 to speed dial the associated number. Examples of valid key words include "BANK", "ACCOUNT BALANCE", "OFFICE", "TIME", "SECRETARY", "FRIEND", "WORK" AND "INFORMATION." This list is not intended to be exhaustive and any number of key words may be used. Inquiry step 1110 determines if a valid key word has been spoken. If the platform, does not recognize the key word, step 112 prompts the user with the message "Error, please repeat." When the key word is accepted as valid, a "Calling" message is played at step 114.

If the command "MEMORY" is detected at step 1106, the user is prompted with message "Which memory" and the speaker-independent recognizer is engaged. At inquiry step 1130 the speaker-independent recognizer determines if a two-digit memory location number has been spoken by the user. If not, the platform performs a test check at step 1132 to determine if the time out period has elapsed. Once the time out period elapses, the user is prompted at step 1134 with a "Please enter next digit" message. Once the 2-digit memory location number is collected, the telephone number associated with the memory location number is recalled at step 1136 from FLASH memory 30. The user is then notified at step 114 with a "Calling" message.

Once a key word or memory call location is collected, the speaker-independent voice recognizer is engaged at step 1116. The speaker-independent voice recognizer monitors at inquiry step 1118 for a spoken command "VERIFY", and when the "VERIFY" command is detected, the stored number associated with the key word or memory location is repeated to the user at step 1122. At inquiry step 1124, the speaker-independent recognizer monitors for a spoken command "CLEAR" indicating that the user desires to clear the number retrieved and start again. If so, the taped message "Ready" is played at step 1126 and Control returns to step 1108. If neither the "CLEAR" command nor the "VERIFY" command are recognized, inquiry step 1120 determines if the voice command "SEND" has been spoken. If not, the user is prompted at step 1138 with an "Error, please repeat" message and control passes back to step 1116. Otherwise, control passes to step 320 of the originating call/command handler routine of FIG. 8 to call the selected number.

Figure 12:
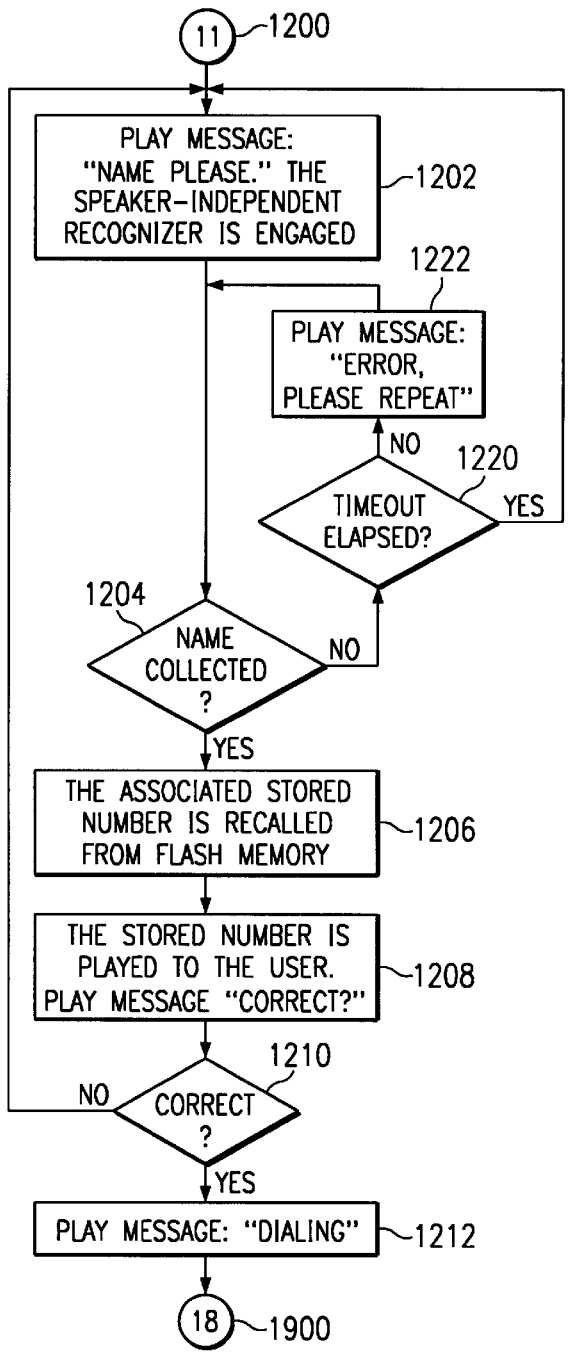
FIG. 12 is a flow chart of the routine for providing speed dialing capabilities from speaker-dependent words stored by the user and associated with each telephone number or numeric sequence to be dialed.

Referring now to FIG. 12, there is illustrated the routine for speed dialing from a pregenerated user directory. This routine enables a user to speed dial a number from a preexisting directory using speaker-dependent names. The user is prompted at step 1202 with a "Name please" message. Step 1202 also engages the speaker-dependent recognizer. At inquiry step 1204, a determination is made if a spoken name has been collected and recognized by the speaker-dependent recognizer. If no name has been recognized, step 1220 determines if the timeout period has elapsed, and if not, prompts the user at step 1222 with an "Error, please repeat" message. Once the timeout period elapses, the user is further prompted with the "Name please" message of step 1202.

Once the name is collected at step 1204, the telephone number associated with the name is recalled at step 1206 from FLASH memory 30. The stored number is played to the user at step 1208 after which the user is prompted with a "Correct" message. Inquiry step 1210 then monitors for a spoken command "CORRECT." Upon detection of the "CORRECT" command, the user is provided with a "Dialing" message and control passes to step 320 of the originating call/command handler routine of FIG. 8. When the "CORRECT" command is not received, control returns to step 1202 to have the user repeat the name.

Referring now to FIG. 13, there is illustrated the key word speed dial number storage routine. This routine enables a user to associate a selected speaker-independent key word with a telephone number and have the number and associated key word stored in memory. Initially, the user is prompted at step 1402 with a "Storing" message as the digit string from FIG. 10 is saved, and the speaker-independent recognizer is engaged. The speaker-independent speech recognizer monitors at step 1404 for the spoken command "MEMORY." This enables the user to stop the number at a location identified by a two-digit memory code. If the "MEMORY" command is received, control passes to the memory speed dial number storage routine of FIG. 14. Otherwise, the spoken independent recognizer monitors at step 1406 for a spoken command "DIRECTORY." If the "DIRECTORY" command is detected, control passes to the director speed dial number storage routine of FIG. 15, and the user may store a directory name or a number associated with a directory name.

When neither a "MEMORY" nor "VOICE" command is detected, the recognizer monitors at step 1410 for entry of a new speaker-independent key word. When no new key word is detected, an "Error, please repeat" message prompts the user to enter a spoken command or key word at step 1420 and control returns to inquiry step 1404. When a new key word is collected, the user is prompted at step 1412 with a "Storing (key word) correct" message. Inquiry step 1414 then determines if the received key word was correct. If not, a "Location, please" message prompts the user at step 1418 to repeat the key word and control returns to step 1410. Once the correct key word is entered, the system advises the user at step 1416 with a "Storing" message, and the number and associated key word are stored in FLASH memory 30. Control then passes to step 304 of the originating call/command handler routine of FIG. 8.

Figure 14:
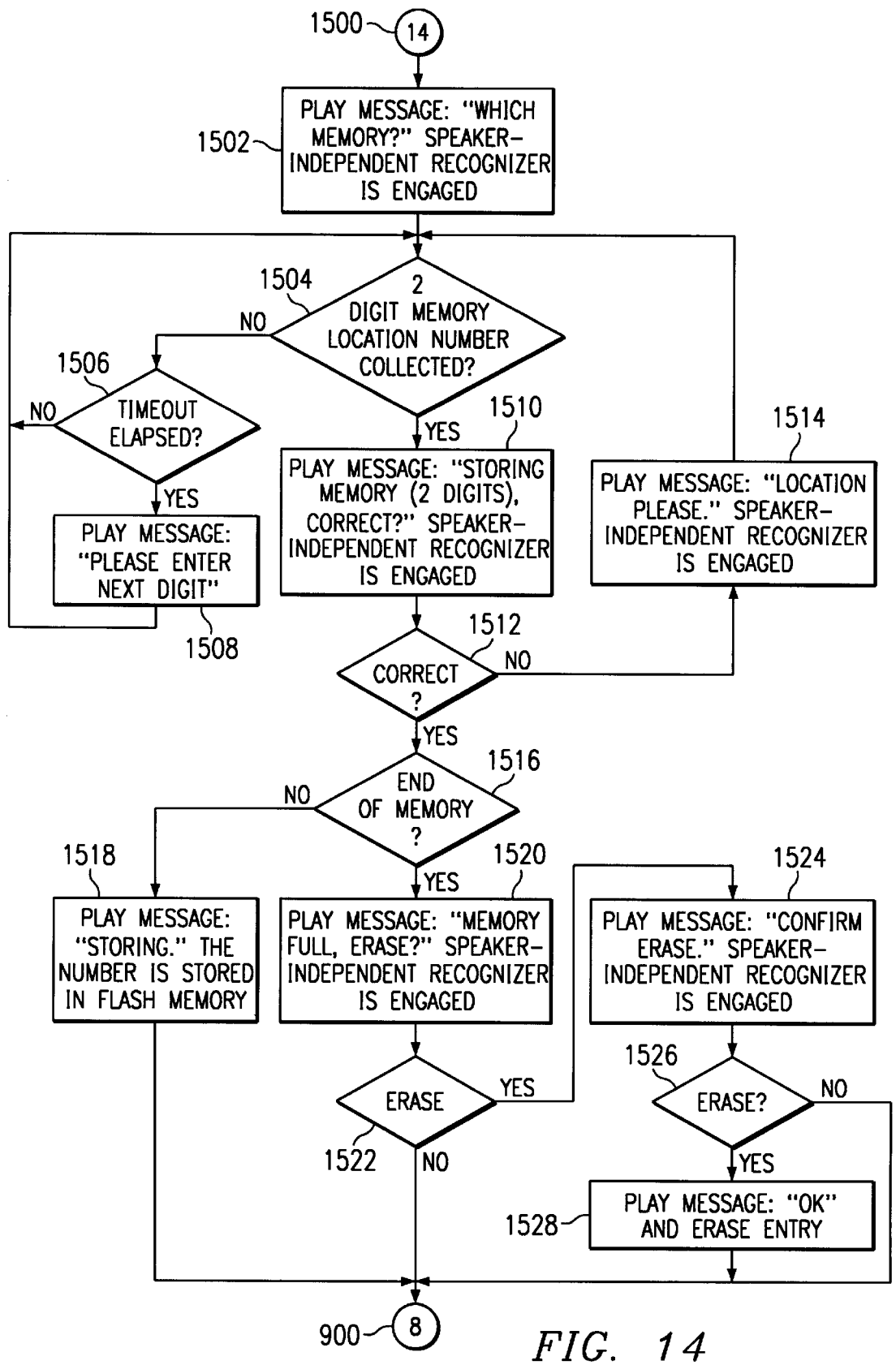
FIG. 14 is a flow chart showing the routine for programming speed dial numbers using numeric memory locations.

Referring now to FIG. 14, there is illustrated the memory speed dial number storage routine. This routine allows the user to store a particular number in a selected memory location having an associated two-digit memory code. The user is prompted at step 1502 with a "Which memory?" message and the speaker-independent recognizer is engaged. At inquiry step 1504, the speaker-independent voice recognizer monitors for receipt and recognition of a 2-digit memory location number. If both digits have not been received, the routine continues to cycle through step 1506 until a timeout period has elapsed. If both digits have not been received, and the timeout period elapses, the user is prompted at step 1508 with a "Please enter next digit" message.

Once both digits for the memory location code are received and recognized, the user receives a "Storing memory (two-digits), correct?" message, indicating the two-digit memory location number the system has collected. If the digits are incorrect, the speaker-independent recognizer is reengaged, the user is prompted at step 1512 with a "Location please" message and control returns to step 1504 to enable the user to reenter the memory location digits. If the received memory location number is correct, a test is performed at step 1516 to determine if the storage memory is full. If not, the user receives a "Storing" message and the number is stored in FLASH memory at step 1518 at the indicated memory location number. System control then returns to step 304 of the originating call command handler routine of FIG. 8.

If step 1516 determines the FLASH memory locator is full, the user is provided with a "Memory full, erase?" message at step 1520. The speaker-independent recognizer then monitors at step 1522 for the voice command "ERASE." If no "ERASE" command is received, the procedure ends and control passes to step 304 of the originating call/command handler routine of FIG. 8. If the "ERASE" command is detected, the user is prompted at step 1524 to confirm the erase instruction, and the voice recognizer again monitors at step 1526 for the voice command "ERASE." If the "ERASE" command is confirmed, the identified location entry is erased at step 1528.

Figure 15:
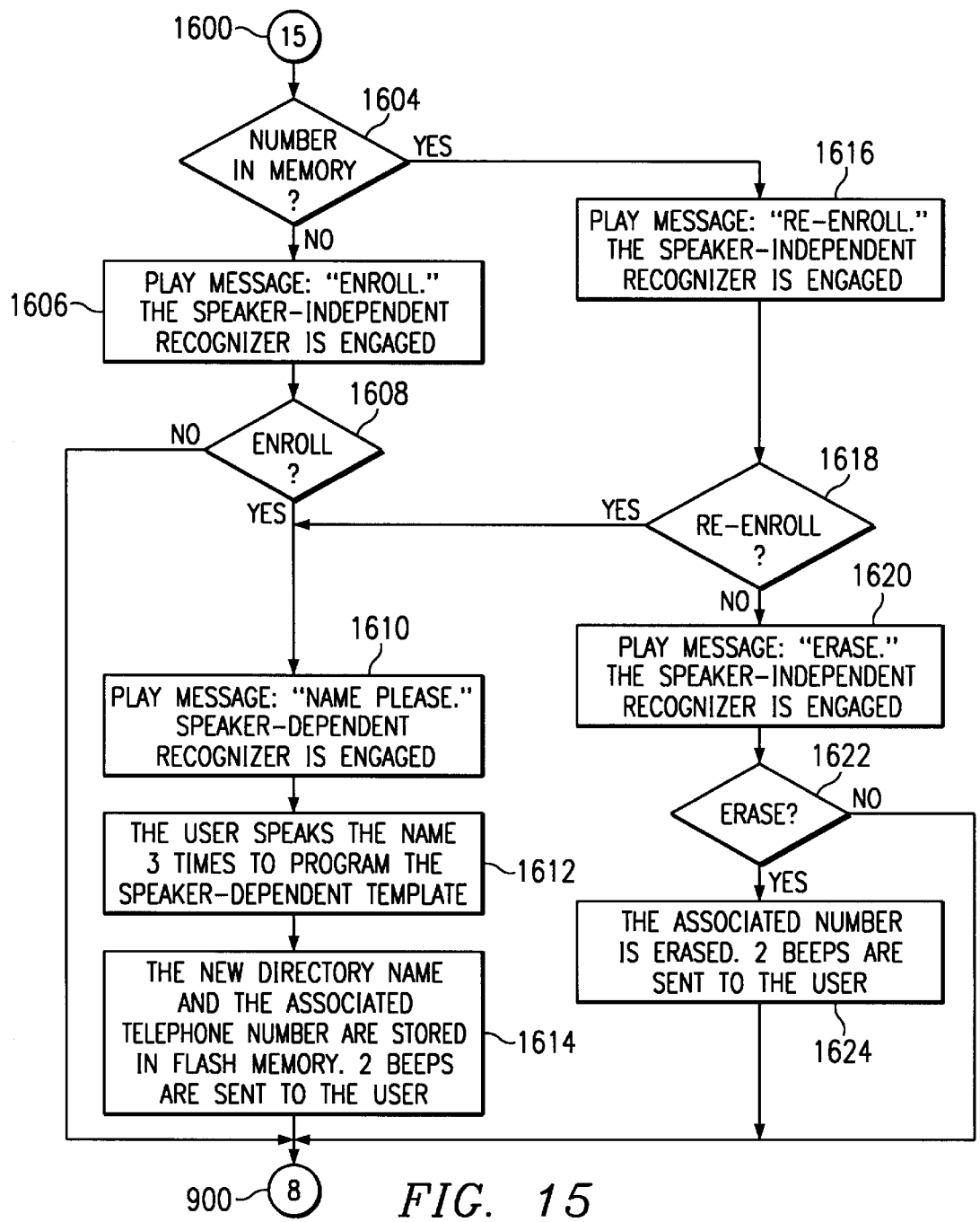
FIG. 15 is a flow chart showing the routine for programming speed dial numbers using speaker-dependent directory words.

Referring now to FIG. 15, there is illustrated the directory speed dial number storage routine. This routine stores a number in a personal directory responsive to speaker-dependent directory names. The personal directory will be responsive only to commands from a particular user. Initially, the routine checks at step 1604 to determine if the selected number is already stored in FLASH memory. If the number is presently stored, the user is prompted with a "Re-enroll" message at step 1616. The speaker-independent speech recognizer then monitors at step 1618 to determine if the user wishes to re-enroll the directory name. If the user wishes to re-enroll the directory name, the user is prompted at step 1610 for a name to be associated with the number. If the directory name is not to be re-enrolled, an "Erase" message prompts the user and the voice recognizer monitor is engaged at step 1620. Inquiry step 1622 determines if the user wishes to erase the directory number. If not, control passes to step 304 of FIG. 8. If the directory number is to be erased, the associated number is erased and two beeps notify the user of the erasure at step 1624. Command control then returns to step 304 of FIG. 8.

If inquiry step 1604 determines the number is not presently enrolled in memory, the user is prompted with an "Enroll" message and engages the speaker-independent recognizer. A test at step 1608 determines if the number should be enrolled. If the number is not to be enrolled, control passes to step 304 of the originating call/command handler routine of FIG. 8. Otherwise, the user is prompted at step 1610 for a name to be associated with the number and the speaker-dependent recognizer is engaged. The user speaks the name to be associated with the number three times at step 1612 to program the speaker-dependent template. The new directory name and associated telephone number are stored at step 1614 in FLASH memory, and the user is notified of this by two beeps. Control then passes to step 304 of the originating call/command handler routine of FIG. 8.

Figure 16:
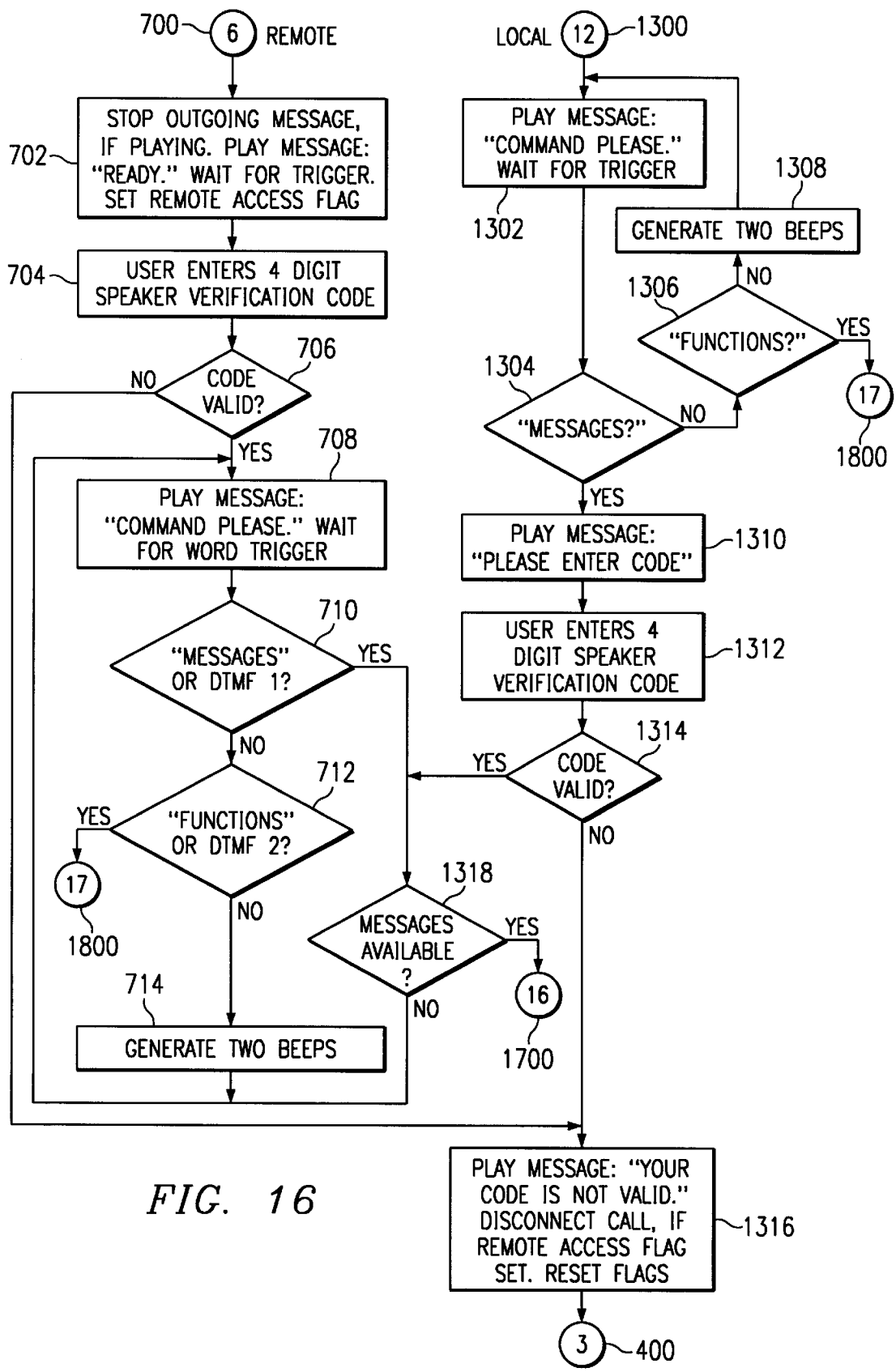
FIG. 16 is a flow chart showing the routine for changing programming parameters through both local and remote access.

Referring now to FIG. 16, there is illustrated the system access routine. The system access routine enables access to the platform either remotely beginning at point 700 or locally beginning at point 1300. The access pathway depends on whether a caller from an outside line is accessing the platform, or the caller is using one of the local platform telephones. When the platform is accessed remotely, the outgoing message being played is discontinued and the caller is provided with a "Ready" message at step 702. The system then waits for a command trigger and sets the remote access flag. The user enters at step 704 a four-digit speaker verification code to access the platform. A test performed at step 706 determines if the verification code is valid. If not, the caller is notified of the invalidity of the code, the call is disconnected and flags are reset at step 1316.

When a valid code is received, a "Command please" message prompts the user at step 708, and the platform waits for a command trigger. At inquiry step 710, the platform monitors for either the voice command "MESSAGES" or a DTMF "1" digit. If one of these triggers are detected, the system determines at inquiry step 1318 if any messages are available. When no messages are available, control returns to step 708 to await additional command triggers. If messages exist, control passes to message playback routine of FIG. 17. Inquiry 712 tests for either the voice command "FUNCTIONS" or a DTMF "2" digit. If either of these triggers are detected, control passes to the peripheral control routine of FIG. 18. Otherwise the system generates two beeps to the remote caller at step 714 and control passes back to step 708.

If a user accesses the system locally through point 1300, the user is initially prompted with a "Command please" message at step 1302 and awaits a command trigger. Inquiry step 1304 determines if the voice command "MESSAGES" is spoken and, if so, the user is prompted at step 1310 to enter a verification code. The user enters a four digit speaker verification code at step 1312, and the validity of the code is tested at inquiry step 1314. If the verification code is valid, control passes to step 1318 to provide the user access to his messages as previously described. If the verification code is invalid, control passes to step 1316 and the user is notified of the invalid code and disconnected from the platform. If no "MESSAGE" command is received, inquiry step 1306 monitors for a voice command "FUNCTIONS" and passes control to the peripheral control routine if the "FUNCTIONS" command is detected. Otherwise, two beeps are generated to the user at step 1308 and control passes back to step 1302 to monitor for command triggers.

Figure 17:
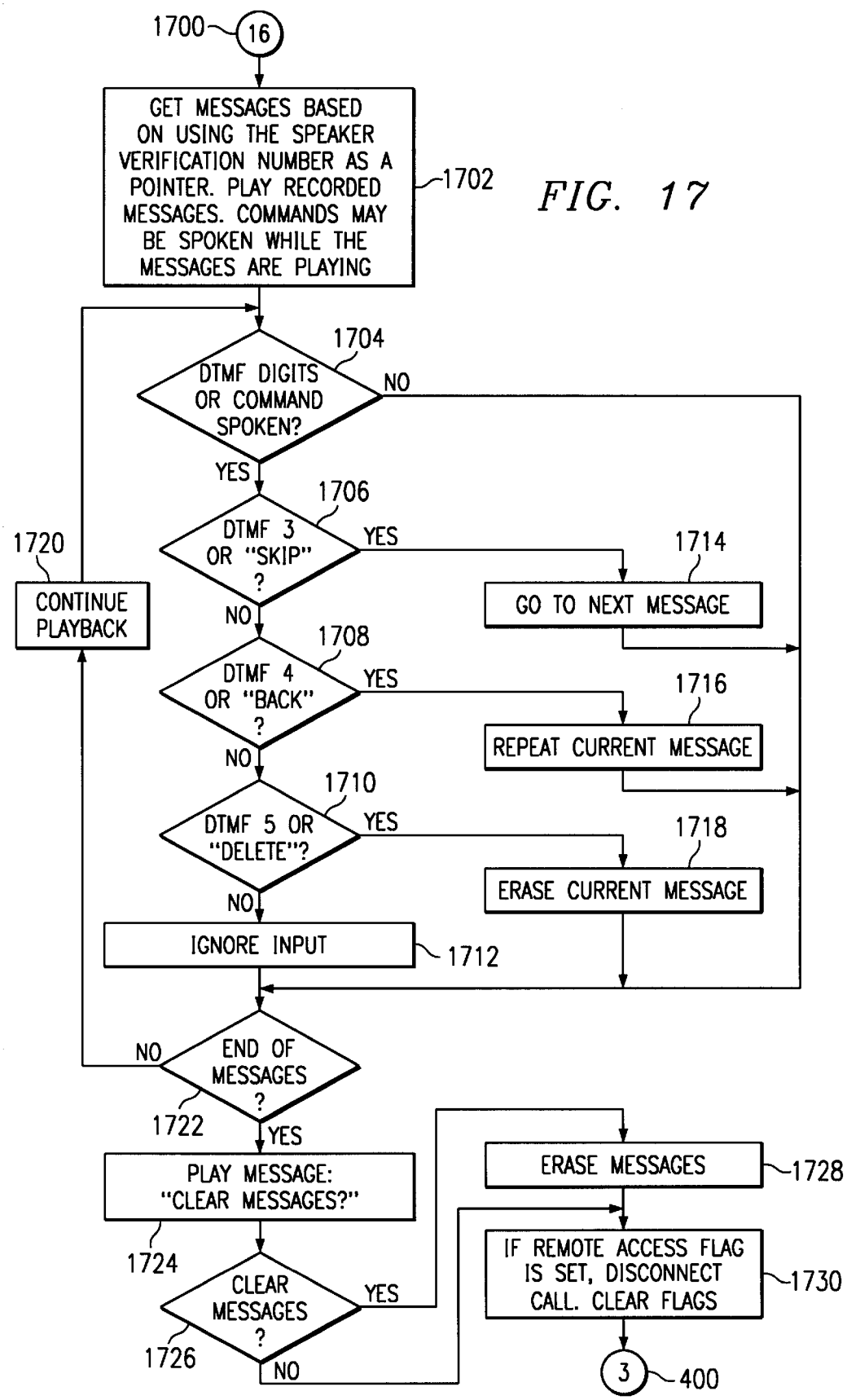
FIG. 17 is a flow chart of the routine for playing back messages from callers.

Referring now to FIG. 17, there is illustrated the message playback routine. This routine enables a user to review recorded messages. Messages are retrieved at step 1702 based upon the speaker verification number provided by the user, and the messages associated with the identified speaker are played. Inquiry step 1704 monitors for receipt of DTMF digits or any spoken commands during playing of the messages. If neither is detected, step 1722 monitors for the end of the selected messages and continues playback at step 1720 until the end of the messages is detected. Once the end of the messages is reached, the user is prompted at step 1724 with a "Clear Messages" message. Inquiry step 1726 determines if the messages are to be cleared. If the messages are not to be cleared, control passes to step 1730 wherein the call is disconnected if the remote access flag is set. If the messages are to be cleared, they are erased at step 1728. Control then returns to the executive routine of FIG. 4.

If a DTMF digit or spoken command is detected at step 1704, inquiry step 1706 determines if the received command is either a DTMF "3" digit or a spoken command "SKIP." If so, the systems proceeds to the next recorded message at step 1704. If a DTMF "4" digit or "BACK" command is detected at inquiry step 1708, the current message is repeated at step 1716. If either a DTMF "5" digit or "DELETE" command is detected at step 1710, the current message is erased at step 1718. If none of the above-described triggers are detected, the input is ignored at step 1712 and control passes back to step 1722.

Figure 18:
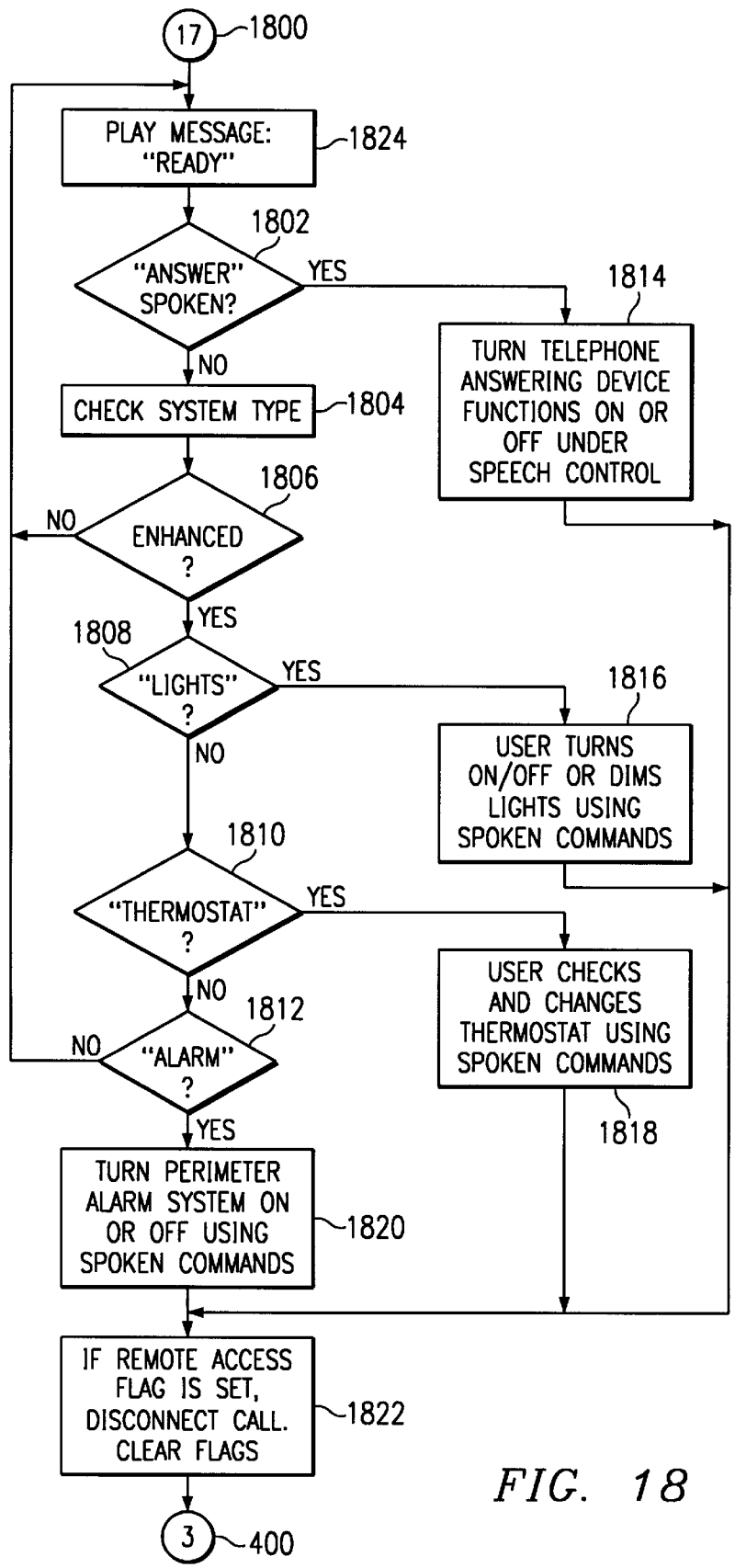
FIG. 18 is a flow chart of the peripheral control routine used to operate lights, thermostats, alarm systems, televisions, stereos, or other electronic devices.

Referring now to FIG. 18, there is illustrated the peripheral control routine. The peripheral control routine enables a user to access and control a variety of systems 18, 20, 22, 24, 26 within a home or business through the telephone system using a series of voice commands. When the peripheral control routine is accessed, the user is initially prompted at step 1824 with a "Ready" message. The system then monitors for the spoken command "ANSWER" at step 1802. If the "ANSWER" command is received, the telephone answering device functions are turned on or off at step 1814. If no "ANSWER" spoken command is received, the system type is checked at step 1804. Test step 1806 monitors for the command enhanced. If not detected, control returns to the prompting step 824. If the enhanced command is received, inquiry steps 1808, 1810 and 1812 monitor for the commands lights 24, thermostat 20 or alarm 18 respectively. If none of these spoken commands are detected, control returns to prompting step 1824.

If a "LIGHTS" command is received, the lights 24 may be dimmed or turned on or off at step 1816 using spoken commands. If the "THERMOSTAT" command is received, the user may check and change the thermostat settings using spoken commands at step 1818. If the "ALARM" command is received, the user may turn on or off the perimeter alarm system 18 using spoken commands at step 1820. Once access of the peripheral devices is complete, control passes to step 1824 wherein the call is disconnected, remote access flag is set and all other flags cleared at step 1822 wherein all flags are reset and the call is disconnected. The system then returns to the executive routine described in FIG. 4.

While the above description of FIGS. 4 through 18 have been given with respect to the use of vocal commands to enable access to the variety of telephone services made available to user by the intelligent call platform, the above described platform would function equally well using push-button entry of DTMF digit commands as opposed to vocal commands. Alternatively, both voice and/or vocal commands could be utilized.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A control platform for use between a remote switching system and an on-site telephone system including at least one telephone, the platform comprising:

means for interfacing the platform directly to the on-site telephone system;

a trigger recognizer for recognizing voice or DTMF command triggers input through the at least one telephone;

announcing means for providing predetermined messages;

processor means, operative under the control of a program stored therein and responsive to receipt of an incoming call from the remote switching system, for identifying a source identifier of the incoming call; and the processor means, further operative under the control of the program and responsive to receipt by the trigger recognizer of a first voice or DTMF command trigger during the ringing stage of the incoming call, for controlling the announcing means to announce to a user an identification associated with the source identifier of the incoming call.

2. The control platform of claim 1, wherein the processor means is further operative under the control of the program and responsive to receipt by the trigger recognizer of a second command trigger entered by the user, for forwarding the incoming call to a selected service.

3. The control platform of claim 2, wherein the selected service comprises playing a message to the incoming call.

4. The control platform of claim 2, wherein the selected service comprises recording a message from the incoming call.

5. The control platform of claim 1, wherein the trigger recognizer comprises a voice recognizer for recognizing characters and commands spoken by the user.

6. The control platform of claim 1, wherein the trigger recognizer comprises a DTMF digit recognizer for recognizing DTMF digits entered by the user.

7. A centralized control platform for providing a variety of telephone services to a local telephone system having at least one telephone, comprising:

a local interface for connecting the platform to the at least one telephone of the local telephone system;

a communications circuit for interfacing the platform to external communications means; and processing means interconnected with the local interface and communications circuit responsive to receipt of an incoming call from the external communications means for providing a user with command triggered access to a plurality of telephone services, the processor further comprising:

trigger recognition means for recognizing voice or DTMF command triggers input by the user through the at least one telephone during the ringing stage of the incoming call; and announcing means for providing predetermined messages to the user.

8. The centralized control platform of claim 7 wherein the processing means further includes means for identifying a caller based upon a caller I.D. number in an incoming call received over the communications circuit and for controlling the announcing means to announce the identified caller in response to receipt of a command trigger by the trigger recognition means.

9. The control platform of claim 8 wherein the processing means further includes means for forwarding the incoming call to a selected calling service in response to receipt of a command trigger by the trigger recognition means.

10. The control platform of claim 9, wherein the selected calling service comprises playing a message to the incoming call.

11. The control platform of claim 9, wherein the selected calling service comprises recording a message from the incoming call.

12. The control platform of claim 7 wherein the processing means further includes means for forwarding all incoming calls to a telephone service for recording messages in response to receipt of a command trigger by the trigger recognition means.

13. The control platform of claim 7 wherein the processing means further includes means for providing access to a selected peripheral system by the control platform in response to receipt of a command trigger by the trigger recognition means.

14. The centralized control platform of claim 13 wherein the processing means further include means for controlling the accessed peripheral system through a telephone handset in response to receipt of a command trigger by the trigger recognition means.

15. The control platform of claim 7 wherein the processing means further includes means for controlling the announcing means to request a user to enter information identifying a destination number to be dialed in response to receipt of a first command trigger by the trigger recognition means.

16. The control platform of claim 15 wherein the processing means further includes means for transferring the information identifying the destination number out over the communications circuit to a destination to which the number corresponds in response to receipt of a second command trigger by the trigger recognition means.

17. The control platform of claim 15 wherein the processing means further includes means for storing the information identifying the destination number for subsequent retrieval and use by the user in response to receipt of a command trigger by the trigger recognition means.

18. The control platform of claim 15 wherein the trigger recognition means comprises a voice recognizer and the information identifying the destination number comprises voice commands.

19. The control platform of claim 15 wherein the trigger recognition means comprises a DTMF digit recognizer and the information identifying the destination number comprises DTMF digits.

20. The centralized control platform of claim 7 wherein the processing means further includes:
   means for controlling the announcement means to request a validation code to provide a user access to the platform in response to receipt of a command trigger by the trigger recognition means; and
   means for providing access to the platform if the user enters a proper validation code in response to a prompt issued by the platform following receipt of a command trigger by the trigger recognition means.

21. The control platform of claim 7 wherein the processing means further includes means for enabling the user to access messages for the user in response to an entered validation code.

22. The centralized control platform of claim 21 wherein the processing means further includes means for controlling playback of the messages in response to receipt of a command trigger by the trigger recognition means.

23. The control platform of claim 7 wherein the control platform and the local telephone system are wireline connected.

24. The control platform of claim 7 wherein the control platform and the local telephone system are wirelessly connected.

25. The control platform of claim 7 wherein the local telephone system comprises a PBX system.

26. The control platform of claim 7 wherein the processing means further includes:
   means for accessing a plurality of outbound telephone services for connection to a remote switching system in response to receipt of a first command trigger by the trigger recognition means; and
   means for initiating an outbound call using one of the plurality of outbound telephone services in response to receipt of a second command trigger by the trigger recognition means.

* * * * *